UNITED STATES PATENT OFFICE.

HERBERT SHORROCKS, OF CHORLTON-ON-MEDLOCK, ENGLAND.

COLORING OF PHOTOGRAPHIC AND CINEMATOGRAPHIC PICTURES.

1,303,506.      Specification of Letters Patent.      Patented May 13, 1919.

No Drawing.      Application filed May 16, 1918. Serial No. 234,997.

*To all whom it may concern:*

Be it known that I, HERBERT SHORROCKS, a subject of the King of Great Britain and Ireland, and resident of 199 Brunswick street, Chorlton-on-Medlock, Manchester, England, have invented certain new and useful Improvements in or Relating to the Coloring of Photographic and Cinematographic Pictures, of which the following is a specification.

This invention has for its object to provide improved means for the production of colored photographic and cinematographic pictures, the said means being simple to carry out and involving a minimum number of operations.

My invention comprises the treatment of positives in black and white which have been made from negatives taken with the aid of red and green color screens, so that the future red pictures are bleached while the future green pictures are stopped against the bleaching action, the positives being then subjected to the action of a combined green-toning and red-dyeing solution, whereby the green and red pictures are produced simultaneously in a single bath or operation.

My invention further comprises a combined toning and dyeing solution consisting of rhodamin with potassium ferricyanid, vanadium chlorid, ferric ammonium citrate, sodium citrate, ammonium chlorid and hydrochloric acid and acting in the manner hereinafter described.

In one convenient application of my invention, negatives are taken with the aid of alternate red and green color screens in the known manner and positives in black and white made from such negatives. The future green pictures, which alternate with the future red pictures, are then stopped out by covering the same with adhesive tape or in any other convenient manner so that when the positives are immersed in a bleaching solution, as for example of iodid and ferricyanid, the future red pictures are bleached while the future green pictures are protected against the bleaching action. After bleaching, the positives are washed and the stopping or protecting means for the future green pictures removed.

The positives are now immersed in a combined green toning and red dyeing solution, whereby the black parts of the image of the future green pictures are toned green and the bleached parts of the image of the future red pictures are dyed red, the clear parts of the picture remaining transparent. I thus perform the coloring operation in one bath and obviate the necessity for two baths as at present usual.

The green toning mixture which I preferably employ in the combined toning and dyeing bath consists of potassium ferricyanid, vanadium chlorid, ferric ammonium citrate, sodium citrate, ammonium chlorid and hydrochloric acid and the red dye which I preferably employ is rhodamin.

A suitable mixture consists of potassium ferricyanid—90 grs., vanadium chlorid 2 drs., ferric ammonium citrate 25 grs., sodium citrate 1¼ ozs., ammonium chlorid 45 grs., hydrochloric acid ¾ oz., rhodamin 30 grs., and water 15 ounces.

My improved means as aforesaid may be applied to pictures where the negatives are produced simultaneously as for example side-by-side pictures (which may be combined in one picture on the objective screen or on the film or on both), instead of alternately as hereinbefore described. The pictures may be printed on both sides of the film, and one side be stopped or protected against bleaching, while the other side is bleached, the whole film being then passed through the combined toning and basic dyeing mixture aforesaid. My improved means may also be applied to other color cinematographic or ordinary camera color photographic processes.

Having now described my invention what I claim as new and desire to secure by Letters Patent is:—

1. Process for producing photographic and cinematographic pictures in two colors, consisting in taking negatives with the aid of red and green color screens, printing positives from such negatives, temporarily stopping out the future green pictures, immersing the stopped and the unstopped pictures in a bleaching solution, washing the positives, removing the stopping out means and immersing both the bleached and the unbleached pictures in a combined dyeing and toning solution, wherein the bleached pictures are dyed red and the unbleached pictures toned green, as set forth.

2. Process for the coloring of black and white photographic and cinematographic pictures in two colors, red and green, consisting in bleaching the pictures to be produced in red and immersing both the bleached and the unbleached pictures in a combined dyeing and toning solution consisting of rhodamin, potassium ferricyanid, vanadium chlorid, ferric ammonium citrate, soda citrate, ammonium chlorid and hydrochloric acid, whereby the bleached pictures are dyed red and the unbleached pictures toned green, as set forth.

In testimony whereof I have signed my name to this specification.

HERBERT SHORROCKS.

Witnesses:
ARTHUR HUGHES,
ERNALD SIMPSON MOSELEY.